No. 728,229. PATENTED MAY 19, 1903.
J. E. HENDERSON.
TRACE FASTENER.
APPLICATION FILED JAN. 27, 1903.
NO MODEL.
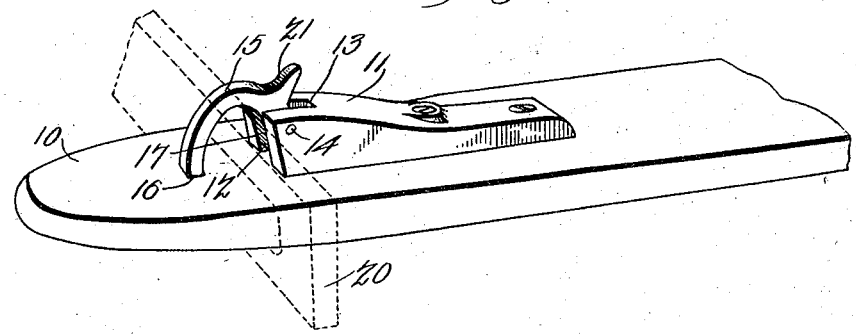
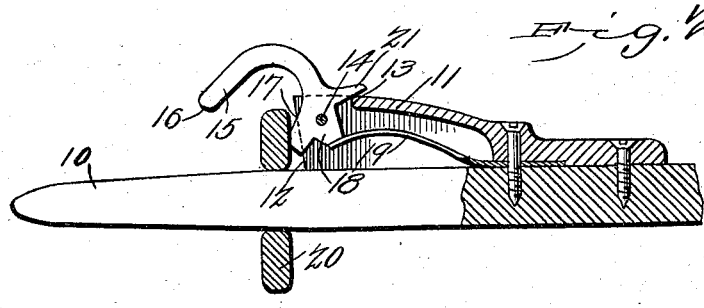
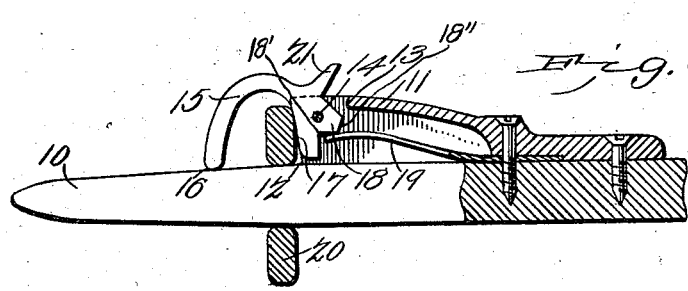
Witnesses
E. F. Stewart
C. N. Woodward
J. E. Henderson, Inventor.
by C. A. Snow & Co.
Attorneys No. 728,229. Patented May 19, 1903.

UNITED STATES PATENT OFFICE.

JAMES E. HENDERSON, OF DENTON, TEXAS.

TRACE-FASTENER.

SPECIFICATION forming part of Letters Patent No. 728,229, dated May 19, 1903.

Application filed January 27, 1903. Serial No. 140,801. (No model.)

*To all whom it may concern:*

Be it known that I, JAMES E. HENDERSON, a citizen of the United States, residing at Denton, in the county of Denton and State of Texas, have invented a new and useful Trace-Fastener, of which the following is a specification.

This invention relates to devices employed for fastening traces or tugs to whiffletrees, and has for its object to simplify the construction of devices of this character and increase the safety and lessen the tendency to accidental displacement or release of the trace; and the invention consists in certain novel features of the construction, as hereinafter shown and described, and specified in the claim.

In the drawings illustrative of the invention, in which corresponding parts are denoted by like designating characters, Figure 1 is a perspective view of the device applied. Fig. 2 is a longitudinal sectional elevation with the spring-actuated hook open, and Fig. 3 is a similar view with the hook closed.

The improved device may be attached to any of the ordinary forms or constructions of whiffletrees, and for the purpose of illustration it is shown thus applied, the whiffletree end being shown at 10.

The improved device consists of a housing or socket 11, closed at the sides and top and with one end 12 open and with an open slot formed in the top and a shoulder 13 formed at the rear of the open slot, as shown. It will be understood that one of the socket members 10 and its attachments will be secured, as by bolts or screws, to each end of the whiffletree, but one only is shown for purposes of illustration. Within the open end of the socket 10 is pivotally secured by one leg, as at 14, an approximately U-shaped trace-holding hook 15, the point 16 of which is adapted to engage the upper face of the whiffletree when the hook is closed, as shown in Figs. 1 and 3. The end 17 extends below its pivot 14 and is preferably beveled or rounded at its inner corner, as shown. The inner edge of this end 17 is adapted when the hook is closed to lie flush with the outer end 12 of the socket member and to extend beyond the end 12 into the path of the trace when the hook is open, as shown in Fig. 2.

Extending rearwardly from the hook member near its pivotal point is a lug 18, having one face 18' extended at right angles to the straight rear edge of the end 17 and adapted to be engaged by a spring 19, secured in any suitable manner in the socket member or to the whiffletree to hold the hook closed, as shown in Fig. 3. The lug 18 is also provided with an upwardly and outwardly inclined face 18", extending obliquely from the face 18' and which is adapted to be engaged by the spring 19 to hold the hook in open position and at such an angle that the free end 16 thereof is held spaced from the upper face of the whiffletree a distance slightly greater than the width of that portion of the trace to be inserted between it and the whiffletree, and the end 17 is projected into the path of an entering trace, the angle at which the hook is thus held being such that a slight pressure on the end 17 will overcome the tension of the spring 19 and release it from engagement with the face 18" of the lug 18 and cause the hook to close under the tension of the spring 19, which slips into engagement with the face 18' on its release from the face 18".

By reference to Fig. 3 it will be noted that the spring exerts its force upon the hook member on the opposite side of the pivot 14 from the free end 16. Hence the spring will operate to maintain the hook yieldably in its closed position when in engagement with the face 18', and by reference to Fig. 2 it will be noted that the spring exerts its force to hold the hook yieldably in its open position when in engagement with the face 18. It will also be noted by reference to Fig. 2 that the end 17 extends for a considerable distance into the space to be occupied by the trace (indicated at 20) when the latter is passed over the end of the whiffletree, so that when the trace is forced beneath the hook it will engage the projection and throw it rearwardly, this movement likewise throwing the lug 18 into its normal position relative to the spring 19 and causing the latter to again close the hook. The end 17 thus becomes a "trip," operated by the entering trace to automatically throw the hook into its closed operative position by the act of "entering" the trace beneath the hook. Thus in hitching up it is only necessary for the operator to force the trace-eye over the end of the whiffletree, when the hook will be snapped closed without the necessity for further action of the operator. By this simple means the fastening means cannot be inadvertently left unsecured, as the trace cannot be placed beneath the hook without tripping it. Hence all danger from the carelessness or negligence of the operator is obviated, as the trace will be securely held in position and cannot be connected without tripping the hook into its safe position.

Another point to be noted is that the abrupt form of the end walls 12 precludes the possibility of the trace forcing the end 17 beyond its normal position. Hence rearward strains upon the pivot 14 or hook 15 will be prevented.

Extending from the hook 15 is a thumb-lug or finger 21 to provide means for readily opening the hook when the trace is to be released, and this lug will be so positioned upon the hook relative to the shoulder 13 that when the hook is turned back into its open position, as shown in Fig. 3, the lug will engage the shoulder and limit the rearward movement of the hook, so that the lug 18 will not be thrown entirely free and out of operative position relative to the spring 19. This is also an important feature of the invention and adds materially to the efficiency and value of the invention, as it obviates any tendency of the hook member to become displaced when operated.

The parts may be constructed of any suitable size or of any suitable material and may be adapted to all sizes and styles of vehicles.

Having thus described my invention, what I claim is—

In a trace-fastener, a socket member having a spring secured therein, an approximately U-shaped hook pivotally mounted by one leg in said socket member, a lug formed on the rear edge of said pivoted leg and spaced from the terminal thereof, said lug having one face disposed at right angles to the straight rear edge of said pivoted leg for engagement by the said spring to hold said hook in closed position, said lug also having a face inclined upwardly and outwardly from said right-angled face for engagement by said spring to hold said hook in open position with its remote free end spaced from the whiffletree a distance slightly greater than the width of that portion of the trace to be inserted between them and with the terminal of its pivoted leg projected into the path of the trace.

In testimony that I claim the foregoing as my own I have hereto affixed my signature in the presence of two witnesses.

JAMES E. HENDERSON.

Witnesses:
  I. L. SMITH,
  J. N. CLARK.